(12) United States Patent
Saes

(10) Patent No.: US 9,198,257 B2
(45) Date of Patent: Nov. 24, 2015

(54) LIGHTING SYSTEM AND METHOD OF RETRIEVING STATUS INFORMATION OF A LIGHTING SYSTEM

(71) Applicant: EldoLAB Holding B.V., Son (NL)

(72) Inventor: Marc Saes, Eindhoven (NL)

(73) Assignee: EldoLAB Holding B.V., Son en Breugel (NL)

( * ) Notice: Subject to any disclaimer, the term of this patent is extended or adjusted under 35 U.S.C. 154(b) by 0 days.

(21) Appl. No.: 14/366,162

(22) PCT Filed: Dec. 20, 2012

(86) PCT No.: PCT/NL2012/050906
§ 371 (c)(1),
(2) Date: Jun. 17, 2014

(87) PCT Pub. No.: WO2013/095133
PCT Pub. Date: Jun. 27, 2013

(65) Prior Publication Data
US 2014/0333207 A1    Nov. 13, 2014

Related U.S. Application Data

(60) Provisional application No. 61/578,397, filed on Dec. 21, 2011.

(30) Foreign Application Priority Data

Dec. 22, 2011   (NL) ..................................... 2008017

(51) Int. Cl.
*H04B 10/00*       (2013.01)
*H05B 33/08*       (2006.01)
(Continued)

(52) U.S. Cl.
CPC ............ *H05B 33/089* (2013.01); *H04L 12/403* (2013.01); *H04L 12/417* (2013.01); *H05B33/086* (2013.01); *H05B 33/0845* (2013.01); *H05B 33/0884* (2013.01); *H05B 37/0254* (2013.01)

(58) Field of Classification Search
USPC ................. 340/286.01, 286.02; 398/128, 135
See application file for complete search history.

(56) References Cited

U.S. PATENT DOCUMENTS 6,051,989 A    4/2000   Walck
6,297,724 B1  10/2001   Bryans et al.
(Continued)

FOREIGN PATENT DOCUMENTS

EP    2 237 647 A2   10/2010

OTHER PUBLICATIONS

Goddard, Robert, "RDM's physical layer: Testing transceivers and bias networks", retrieved from the internet: URL: http://www.rdmprotocol.org/files/Protocol Summer 2011 RDM Testing.pdf, Aug. 30, 2011, pp. 24-27.

(Continued)

*Primary Examiner* — Thuy Vinh Tran
(74) *Attorney, Agent, or Firm* — Hoffmann & Baron, LLP

(57) ABSTRACT

A method of retrieving status information of a lighting system includes propagating a command signal from a controller to a node of the lighting system by operating upstream transceivers that are upstream of the node in a transmitting mode and operating downstream transceivers that are upstream of the node in a receiving mode; propagating a reply signal including the status information of the LED unit of the node from the node to the controller by operating the upstream transceivers that are upstream of the node in a receiving mode and operating each of the downstream transceivers upstream of the node in a transmitting mode and reversing an operating mode of an upstream transceiver of a network segment from operating in a transmitting mode to operating in a receiving mode only when the downstream transceiver is operating in transmitting mode.

19 Claims, 8 Drawing Sheets

(51) Int. Cl.
*H05B 37/02* (2006.01)
*H04L 12/417* (2006.01)
*H04L 12/403* (2006.01)

(56) References Cited

U.S. PATENT DOCUMENTS 8,180,225 B2 * 5/2012 Werthen et al. ............... 398/171
2002/0047628 A1 4/2002 Morgan et al.
2008/0310850 A1 * 12/2008 Pederson et al. .............. 398/135
2015/0086213 A1 * 3/2015 Pederson et al. .............. 398/128

OTHER PUBLICATIONS

"LightingDemo: Controlling High Power LEDs using DMX512 and DALI", Retrieved from the Internet: URL: http://cache.freescale.com/files/micro controllers/doc/user_guide/LGHTNG_RD_UM.pdf, Dec. 1, 2009, pp. 1-54.

* cited by examiner

LIGHTING SYSTEM AND METHOD OF RETRIEVING STATUS INFORMATION OF A LIGHTING SYSTEM

CROSS-REFERENCE TO RELATED APPLICATIONS

This application is the National Stage of International Application No. PCT/NL2012/050906 filed Dec. 20, 2012, which claims the benefit of Netherlands Application No. 2008017, filed Dec. 22, 2011, and of U.S. Provisional Application No. 61/578,397, filed Dec. 21, 2011, the contents of all of which are incorporated by reference herein.

FIELD OF THE INVENTION

The invention relates to the field of lighting devices and systems and more specifically to obtaining diagnostic data on the operation of LED based lighting systems.

BACKGROUND OF THE INVENTION

The present invention relates to LED based lighting systems, in particular lighting systems comprising a large amount of LED units, each LED unit comprising one or more LEDs. Such lighting systems can e.g. be applied to display images on walls of buildings or provide in a light show on such a wall.

In general, the output characteristics of the large amount of LED units are controlled by connecting the LED units to a control unit via a network. As an example, the lighting system can comprise one or more groups of LED units in a daisy chain arrangement, whereby control signals are provided to the LED units using the DMX protocol, whereby the LED units are e.g. connected to each other via a RS-485 multi master bus.

When such a lighting system is in operation and e.g. provided to a wall of a tall building, it may be difficult to detect the malfunctioning of one or more of the LED units or at least to assess exactly which of the LED units is malfunctioning. Further, even if such detection were feasible, a quick repair of a malfunctioning LED unit is such a system would be difficult and time consuming. As such, the availability of the lighting system can be compromised at times.

Further, with respect to the application of differential lines like the RS-485 communication bus over comparatively large distances, it has been observed that such systems may be susceptible to EMI (electromagnetic interference). In order to avoid such EMI issues, it is often proposed to use so-called pull-up or pull-down resistances and to use a shielded communication line. Such solutions however result in an increased cost for the system or increase the overall power consumption of the system.

SUMMARY OF THE INVENTION

It would be desirable to provide a lighting system whereby the maintenance of the system is facilitated.

It would also be desirable to improve the availability of the lighting system by providing an improved way of monitoring an operational status of the lighting system.

It would also be desirable to provide a network based lighting system which is less expensive and/or is less power consuming.

To better address one or more of these concerns, in a first aspect of the invention, there is provide a method of retrieving status information of a lighting system, the lighting system comprising a plurality of LED-based lighting units arranged as nodes in a linear daisy-chained network, the network having network segments connecting two subsequent nodes downstream of a controller via an upstream transceiver and a downstream transceiver of the network segment, the method comprising:

propagating a command signal from the controller to a node of the lighting system by operating the upstream transceivers of the network segments that are upstream of the node in a transmitting mode and operating each of the downstream transceivers of the network segments that are upstream of the node in a receiving mode;

propagating a reply signal comprising the status information of the LED unit of the node from the node to the controller by operating the upstream transceivers of the network segments that are upstream of the node in a receiving mode and operating each of the downstream transceivers of the network segments upstream of the node in a transmitting mode whereby the method further comprises:

reversing an operating mode of an upstream transceiver of a network segment from operating in a transmitting mode to operating in a receiving mode only when the downstream transceiver of the network segment is operating in transmitting mode.

In a first aspect, the present invention provides in a method for retrieving status information of a lighting system, wherein the lighting system comprises a plurality of LED-based lighting units arranged as nodes in a linear daisy-chained network. Such status information can e.g. comprise at least one of a temperature, an intensity, an operating state, a forward voltage or a current of any of the LED based lighting units and may e.g. be useful for diagnostic purposes, e.g. to check proper operation of the lighting system. In accordance with the present invention, the lighting units (also referred to as nodes) are connected to each other via network segments and transceivers of the network segments. Such network segments can e.g. comprise RS-485 or other types of differential lines.

In accordance with the first aspect of the invention, the status information of a node of the lighting system is retrieved by propagating a command signal from a controller to the node and propagating a reply signal from the node to the controller.

In an embodiment, the command signal may therefore include a diagnostic command signal for retrieving status information such as diagnostic information about one or more nodes (i.e. lighting units).

As an example, the diagnostic information may provide information about various possible diagnostics issues or events.

Because various issues regarding the proper operation of a lighting unit may be worth reporting, it may be useful to report, in reply to a command signal, a reply signal containing a summary status of the diagnostic status of a node. As an example, such summary status can e.g. comprise a Boolean message indicating whether or not there are diagnostic issues to report. A more detailed summary report could e.g. include an indication of the severity of the worst diagnostic issue to report. So embodiments can make use of a range from a simple Boolean reply up to a detailed diagnostics reply including multiple replies.

The command may also invite the nodes to report only diagnostics at or above a certain severity level. Severity levels may be arranged to a simple scheme such as FAILED/OPERATIONAL or ERROR/WARNING/INFO up to numbered schemes f.e. from 0 to 10 where 0 is "normal operation" and 10 is "no light output", etcetera.

In general, such a controller or control unit can e.g. comprises a microprocessor or the like. In order to propagate the command and reply signals, the transceivers of the network segments have to be properly operated; i.e. operate in the appropriate mode to transmit or receive signals.

In an embodiment, the operating mode of the transceivers of the network segments can e.g. be controlled by the nodes, in particular by a control unit of the nodes which can e.g. equally the operation of the LED or LEDs of the lighting unit.

In order to propagate the command signal to a node in the chain of nodes, the upstream transceivers of the network segments that are upstream of the node are operated in a transmitting mode while the downstream transceivers of the network segments that are upstream of the node are operated in a receiving mode. In accordance with the present invention, 'downstream' is used to denote a position closer to the end of the chain of nodes (or more remote of the controller) whereas 'upstream' is used to denote a position closer to the controller.

In order to propagate a reply signal from a node to the controller, the reply signal comprising status information of the node, the operating mode of the transceivers has to be reversed.

In accordance with the present invention, such reversal is executed in a particular manner; an operating mode of an upstream transceiver of a network segment is reversed from operating in a transmitting mode to operating in a receiving mode only when the downstream transceiver of the network segment is operating in transmitting mode. Phrased differently, during operation, it is ensured that at least one of the transceivers of network segments is operating in a transmitting mode. By doing so, a floating away of the voltage of the network segment can be avoided. As a consequence, there is no longer the necessity to implement a biasing of the network segment, e.g. by using a pull-up or pull-apart network.

As a result, the network segments are less susceptible to EMI or EMC interference. Further, the network segments are less likely to be the cause of such EMI, due to the absence of the pull-up or pull-apart network.

Further, due the absence of such a network, losses (Ohmic losses) occurring in such a network can be avoided as well, resulting in a more efficient operation.

In order to ensure that both transceivers of a network segment do not operate in a receiving mode, various options exist.

In an embodiment, the reversing from operating in a transmitting mode to operating in a receiving mode of the upstream transceiver of a network segment is performed after a predetermined waiting period after the command signal has been transmitted. In this embodiment, the waiting period is selected sufficiently long to ensure that the downstream transceiver of the network segment has reversed its operation to transmitting mode.

In another embodiment, the reversing from operating in a transmitting mode to operating in a receiving mode of the upstream transceiver of a network segment is performed after a detection of the downstream transceiver of the network segment reversing from operating in a receiving mode to operating in a transmitting mode. Since such a reversal affects the impedance of the network segment as seen by the upstream transceiver, the occurrence of such a reversal can be detected.

In an embodiment of the invention, the command signal comprises an identifier of the node. As such, status information of a particular node can be retrieved. This process can e.g. be repeated for each of the nodes of the lighting system.

In another embodiment, the command signal is propagated until it reaches the end of the network chain, i.e. until it reaches an end node of the chain. Subsequently, a reply signal can be propagated to the controller whereby the reply signal is concatenated with status information of each node, by each node that receives the signal and propagates the signal.

In an embodiment of the invention, the status information is stored in a memory unit of the nodes, such as a shift register. The nodes may be equipped with a plurality of memory units for storing a resp. plurality of operating characteristics such as a temperature, a forward voltage, etc. In case only such memory unit is used, it may be applied to store a particular characteristic or status information substantially continuously, or, upon receipt of a command signal, the required information can be stored. In an embodiment, the memory can be used to store information regarding diagnostically relevant issues that have occurred. As an example, malfunctions that have occurred or temperature limits that have occurred can be recorded, optionally including a time stamp indicating when the issue has occurred, for retrieval later on. As such, any diagnostic event that has occurred since the last status information retrieval can be stored.

In an embodiment, a first command signal (that is e.g. propagated to the end node) may e.g. instruct the nodes to store the required status information (e.g. a detected temperature) in a memory unit such as a shift register of the node, whereas a second command signal instructs the nodes to transmit, as a reply signal, the content of the memory unit one node upstream. By repeating the second command signal, the controller can thus receive the status information of each node; i.e. each issuance of the second command signal results in the receipt of status information of a node. Using this approach, the reply signals can remain comparatively small, compared to a concatenated reply signal containing the status information of each node.

In accordance with a second aspect of the present invention, there is provide a lighting system comprising a plurality of lighting units arranged as nodes in a linear daisy-chained network having network segments comprising a downstream transceiver and an upstream transceiver that are connected to two subsequent nodes of the network, the network segments being connected downstream of a controller of the lighting system, whereby the controller is arranged to provide a command signal to a node of the network and wherein the node is arranged to provide a reply signal in accordance with the method according to the first aspect of the invention.

In an embodiment, the lighting units as applied in the lighting system according to the invention, are LED based lighting unit. In general, such an LED based lighting unit comprises one or more LEDs (e.g. of various colors), a power converter such as a Buck or Boost converter for converting an input power to an appropriate supply power for the LED or LED and a control unit for controlling the LED or LEDs and/or the power converter.

In accordance with the present invention, such a control unit may also control an operating state of the upstream transceiver and downstream transceiver that are connected to the lighting unit. Alternatively, a dedicated control unit may be provided for controlling the operating state of the transceivers.

In yet another aspect, there is provided an LED based lighting unit for operating as a node in a daisy-chained lighting network, the lighting unit comprising:
one or more LEDs;
a control unit for controlling an operating characteristic of the one or more LEDs;

a first terminal for connecting a downstream transceiver of a first network segment of the network;

a second terminal for connecting an upstream transceiver of a second network segment of the network, wherein the control unit is arranged to, in use:

operate the downstream transceiver in a receiving mode to receive a command signal from the first network segment;

generating a reply signal comprising status information of at least one of the one or more LEDs;

operate the upstream transceiver in a transmitting mode to propagate the command signal to the second network segment; and reverse an operating state of the upstream transceiver of the second from operating in a transmitting mode to operating in a receiving mode only when a further transceiver of the second network segment is operating in transmitting mode.

These and other aspects of the invention will be more readily appreciated as the same becomes better understood by reference to the following detailed description and considered in connection with the accompanying drawings in which like reference symbols designate like parts.

DETAILED DESCRIPTION OF THE INVENTION

Figure 1:
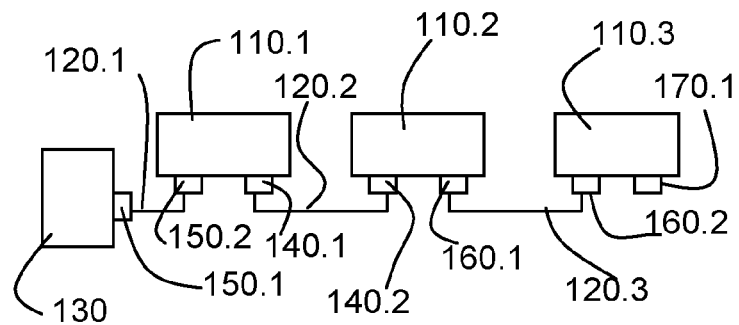
FIG. 1 schematically depicts a first embodiment of lighting system according to the present invention.

FIG. 1 depicts a lighting system comprising a plurality of lighting units 110.1 to 110.3 connected by network segments 120.1 to 120.3 thus forming a linear daisy-chained network, whereby the daisy-chained network is provided at one end with a control unit or controller 130 arranged to provide command signals to the lighting units 110 of the lighting system (an information flow from the controller towards the lighting units is referred to as downstream) and to receive reply signals from the lighting units (such information flow being referred to as upstream). In order to transmit and receive commands, transceivers are provided between the lighting units (further on also referred to as nodes) and the network segments. As an example, network segment 120.2 is provided with a pair of transceivers 140.1, 140.2 enabling a signal to be provided to or received from the nodes 110.1 and 110.2. In the arrangement as shown, the controller 130 is also provided with a transceiver 150.1 for transmitting a signal to the lighting units. This can e.g. be realized by operating the transceiver 150 in transmitting mode and the transceiver 150.2 of node 110.1 in receiving mode. The signal can thus be provided to node 110.1 as a differential signal, e.g. according to the DMX-512 or RDM protocol.

The network segments may e.g. be differential lines such as a half duplex RS-485 network. Conventionally, such an RS-485 network or other type of communication network based on differential signaling such as LVDS, requires that only one device can drive the differential line at a time. As such, other drivers (i.e. transmitters of the transceivers) are thus disabled (i.e. put in a high-impedance mode) when they are not in use. As such, in a conventional network, a situation may occur whereby all line drivers are disabled. When no measures are taken, such a situation may cause the line to float to an unknown level which may cause one or more random changes being read on the line, thereby decreasing the system accuracy. Conventionally, a biasing of the line is implemented such that a line, when all drivers are in a high-impedance mode, does not float to an unknown level. Such biasing is often implemented by a passive pull-up or pull apart network.

In order to provide a signal (e.g. comprising a desired illumination characteristic for the lighting units) to all the lighting units that are connected, the signal needs to be passed-on by the lighting units throughout the chain. In order to do so, all downstream transceivers (i.e. the transceivers connected at a downstream end of the network segments, such as transceivers 150.1, 140.1 and 160.1, can be operated in transmitting mode (whereby the transmitters of the transceivers are thus enabled), while the upstream transceivers, such as transceivers 150.2, 140.2 and 160.2, can be maintained in receiving mode. Transceiver 170.1 denotes an unconnected transceiver of the final node 110.3 of the chain.

In the present invention, the system as described is applied to retrieve status information such as operational data (which can e.g. be used for diagnostic purposes) of the lighting system, e.g. of one or more nodes of the system.

Such operational data can e.g. be an operating temperature or a forward voltage of an LED of the lighting unit, a status of an LED (either ON or OFF), an intensity of the LED, etcetera.

The status information retrieved may also be presented in terms of diagnostic information, i.e. providing information on the proper operation of a lighting unit (based on a particular operating status) rather than providing the actual operating state. As such, the retrieved information (retrieved by propagating a reply signal upstream through the chain of nodes towards a controller) can indicate any diagnostic issues, see further on.

In order to retrieve such operational data or diagnostic data or information, a particular command signal (recognizable by the nodes as an instruction to provide the required data) can be provided to one or more of the nodes in a similar manner as providing a control signal for controlling an illumination characteristic. In order for the retrieval of the operational data, signals have to be provided in the upstream direction, i.e. towards the controller 130. Such reply requires a change-over of the operating mode of the transceivers connecting the various nodes with the network segments.

In accordance with the present invention, this change-over process is timed in such manner that two transceivers that are connected to the same network segment do not have an overlapping operation in the receiving mode. By proper timing of the change-over from operating in transmitting mode to operating in receiving mode, and vice versa, it is ensured that, at each time, at least one of the transceivers connected to a network segment is thus operating in a transmitting mode.

With reference to the arrangement as shown in FIG. 1, this can be explained in more detail as follows:

In order to receive a signal representing or containing operational data from node 110.2, a command signal may first be provided to node 110.2 in a manner as described above; transceivers 150.1 and 140.1 operating in transmitting mode, transceivers 150.2 and 140.2 operating in receiving mode. In order to provide a reply signal by the node 110.2 to the controller 130, the operating mode of these transceivers has to be changed. In accordance with the invention, such a change-over is done by the following steps:

when the command signal is transmitted by transceiver 140.1. to node 110.2, the transceiver remains operational in the transmitting mode, thereby transmitting a predetermined voltage on the network segment 120.2.

when the command signal has been received by the node 110.2, the transceiver 140.2 reverses its operation from receiving mode to transmitting mode, thereby transmitting the same predetermined voltage on the network segment 120.2. By doing so, there is no conflict with the operating mode of the transceiver 140.1 which applies the same voltage to the network segment.

In a next step, the transceiver 140.1 reverses its operation from transmitting mode (transmitting the predetermined voltage) to receiving mode.

In accordance with an embodiment of the invention, this reversal is performed after a predetermined waiting time. Such waiting time should take into account a possible reaction time of the downstream transceiver, i.e. transceiver 140.2 to reverse its operation mode from receiving mode to transmitting mode; the transceiver 140.1 should not reverse its operation to receiving mode while the transceiver 140.2 is still in receiving mode.

At the same time, the predetermined waiting period should at the same time be sufficiently small to ensure that the transceiver 140.1 is in receiving mode when a reply signal (e.g. containing the operation data of the node) is transmitted by the transceiver 140.2 towards the controller 130.

Note that a similar change-over process needs to be performed by transceivers 150.1 and 150.2 once the command signal has been provided to node 110.1 by the controller 130.

The above described way of reversing the operating mode of a transceiver-pair (such as the transceiver pair 150.1 and 150.2 or 140.1 and 140.2) can be applied in different ways to retrieve operational data that could be relevant for diagnostic purposes.

Figure 2:
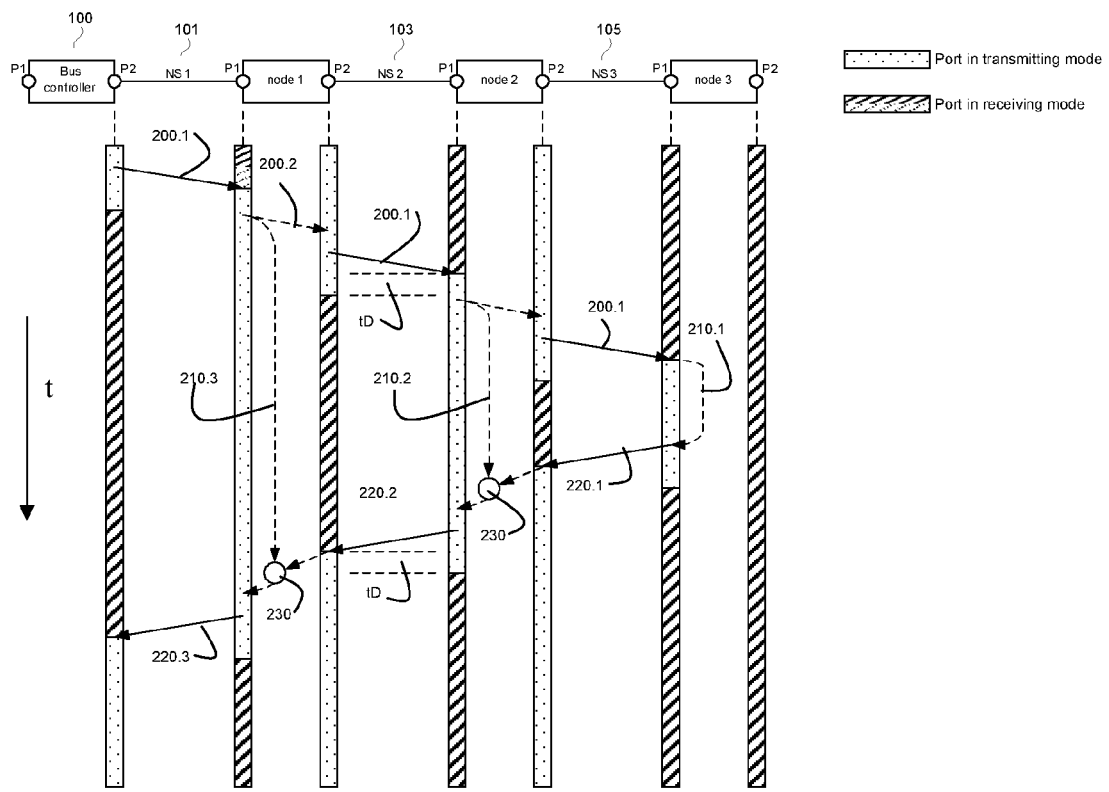
FIG. 2 schematically depicts a first embodiment of a method according to the present invention.

In FIG. 2, a first way of retrieving operation data is schematically shown. In FIG. 2, a daisy-chained network similar to the network of FIG. 1 is shown, having three nodes (node1, node2, node3), a controller (indicated as a Bus controller 100), network segments NS1, NS2, NS3 and ports P1 and P2 (representing transceivers) arranged between the segments and nodes.

The nodes can e.g. represent lighting units such as LED based lighting units.

In FIG. 2, the vertical bars represent, as a function of time t, the operating mode of the ports, either transmitting or receiving mode.

In accordance with the method as shown, a command is first of all propagated throughout the network (indicated by 200.1 as a command propagating through a segment and by 200.2 as a command propagating from a port p1 of a node to a port p2 of the node) until it reaches node3, in general node n of the system.

When the command 200.1 has been transmitted from the bus controller to node1, the bus controller remains in transmitting mode and transmits/supplies a predetermined voltage to the network segment NS1 via its P2 port. In an embodiment, the predetermined voltage can e.g. correspond to voltage as applied in the mark-state. When the command 200.1 has been received by node1 (via its port P1), node1 can reverse its P1 port operating state from receiving mode to transmitting mode. When operating in this transmitting mode, node1 will transmit the same predetermined voltage to the network segment NS1, so that it does not conflict with the transmission by the bus controller. As can be seen in the vertical graphs, there is thus overlap in time (e.g. indicated by the period tD between the dotted lines for segment NS2) whereby both ports P1 and P2 connected to the network segment are operating in transmitting mode. Subsequently, after a predetermined waiting time, the bus controller reverses the operating state of its P2 port from transmitting mode to receiving mode, as can be seen the vertical bar representing the operating mode of port p2. in order to ensure that the network segment remains at a defined voltage (i.e. does not float away), thus predetermined waiting period should be longer than the reaction time of node1 to reverse its port P1 direction from receiving to transmitting mode.

At the same time, the predetermined waiting time should preferable be as short as possible in order for the bus controller to receive reply signals.

This reversal of operating state is further (see FIG. 2) repeated between node1 and node2 and between node2 and node3.

In this way, the command 200.1, 200.2 is forwarded until it reaches the last node; i.e. node3.

Subsequently, the command signal is processed by the node3, resulting in a status information such as a node temperature (indicated by 210.1) being send to the node upstream (indicated by 220.1), i.e. node2 as a response or reply.

Such a response (in general referred to as a reply signal) can e.g. comprise information regarding the operating state (e.g. ON or OFF) or operating conditions such as temperature or intensity of the node. When the node upstream (i.e. node 2) receives the response from node3, an operating state of port P2 of node3 can be set back to receiving mode to prepare for the reception of a next command. Upon receipt of the response from node3, node2 may, in an embodiment, concatenate (indicated by 230) its response to the command to the reply signal 220.1 and sent the concatenated reply signal (indicated in FIG. 2 as 220.2) further upstream. Note that node2 can start the preparation of retrieving its response already before the reply signal from node3 has arrived.

As shown in FIG. 2, this process is repeated until ultimately a reply signal 220.3 is received by the bus controller, the reply signal comprising a response of the nodes.

Subsequently, the reply signal 220.3 can be processed by the bus controller itself or can be communicated to a dedicated diagnostic tool for processing.

By applying the indicated procedures of changing operating states, there is always, for each network segment, a connected transceiver operating in transmitting mode. At times, as shown in FIG. 2, both transceivers connect to a network segment are operating in a transmitting. However, in such a situation both transceivers are not transmitting a command or reply signal, rather a predetermined voltage is transmitted.

As such, at all times, at least on the transceivers is operating in a transmitting mode thereby controlling the voltage of the network segment. By doing so, in accordance with the present invention, no biasing network needs to be implemented in the network segments in order to ensure that the network does not float away to an unknown voltage level. Further details on this are provided below.

With respect to the retrieval of operating data as shown with respect to FIG. 2, the following may further be considered:

In the arrangement as shown, the command signal 200.1, 200.2 is propagated until is reaches the last node in the chain. This can e.g. be done by including an ID identifying the node in the command signal. Alternatively, a node can become aware that it is the final node when a time-out response is received after having sent the command downstream. In the latter case, no actual addressing is required in the command signal; the command signal is propagated until it reaches the end of the chain. Note that such an approach allows for an easy assessment of the length of the chain (i.e. the number of nodes on the chain), which can be used as an important indication of the proper operating of the chain. Such assessment of the length of the chain can be made in various ways:

- in case each node has a unique ID, a reply signal containing this ID can be used to assess, using a database providing information on the position of each identifiable node, the length of the chain. When the ID that is returned does not correspond to the ID expected, this may be an indication of e.g. a rupture or other type of failure of the chain or part of the chain.
- Alternatively, the reply signal can comprise a counter or the like which is incremented by each node that sends the reply signal upstream.

In an embodiment, the command signal can be addressed to a particular node in the chain whereby the command is intended to retrieve only an operational characteristic of that node. This procedure can be repeated by sequentially addressing each node in the chain. If the command signal does not reach the required node e.g. due to a breach in the chain upstream of the node, one of these upstream nodes will receive a time-out response upon which an error signal can be sent as a reply signal to the controller.

Figure 3:
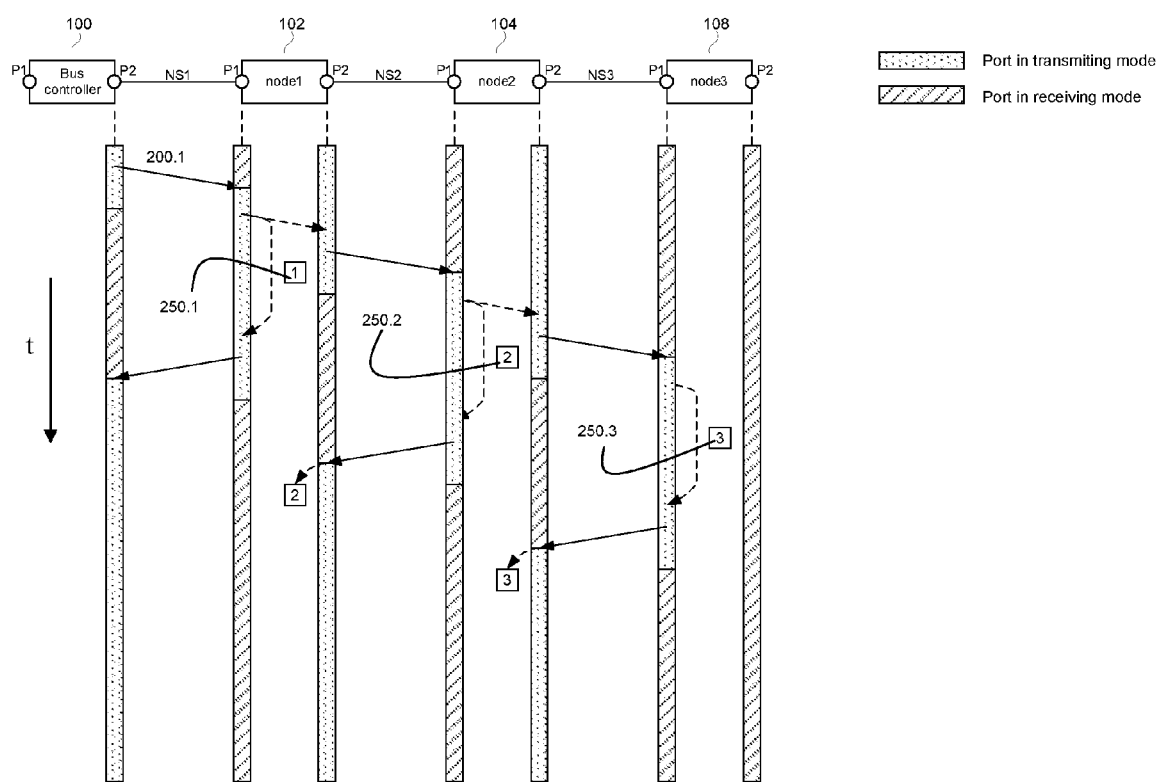
FIG. 3 schematically depicts a second embodiment of a method according to the present invention.

In FIG. 3, an alternative approach for retrieving operating data that can be used for diagnostic purposes is schematically shown. Compared to FIG. 2, the same principles with respect to changing operating mode of the transceivers or ports are applied. Further, as can be seen, a command 200.1 is propagated to the final node in the chain. In contrast to the method as described in FIG. 2, a node receiving the command will, in response:

- send the content of a buffer (reference numbers 250.1 to 250.3 referring to the node buffers 1, 2 and 3) of the node to the node upstream and
- send the command further to the next downstream node.

In general, buffer is used here to denote a memory location such as a shift register where data regarding the operation of the node can be stored. As an example, the buffer can be used to store a value of the sensed temperature of the node.

With respect to timing, as can be seen from the vertical graphs in FIG. 3, node 1 can be arranged to process the command 200 and transmit the content of its buffer (buffer 1) to the controller prior to the node (node 1) receiving a reply signal from node 2 containing the status information of node 2 which is to be stored in the buffer 1.

When the command is issued a first time, the nodes can e.g. be instructed to store a value of a particular operating characteristic in the buffer and transmit the value as a reply signal upstream where it can be stored in the buffer of the node upstream.

So, as a result of the first issuance of the command 200, the operating characteristic of the first node (node1) is outputted and the operating characteristics of the further nodes are shifted one node upwards where they are stored.

A next command may then be issued instructing the nodes to repeat the above steps, i.e. to send the content of the buffer to a node upstream and send the command further downstream.

As such, by each issuance of a command, the operating characteristic can be retrieved. By e.g. marking each response with a node ID, the Bus controller 100 is able to relate the responses to the nodes.

Note that also in this method, the switching from transmitting mode to receiving mode and vice versa needs to be properly timed. When a node receives the command, it preferably sends the command to the downstream node first and then replies with the content of its buffer to the upstream node. However, similar to the method described with respect to FIG. 2, a response can only be issued when the upstream node has switched its P2 port to receiving mode. Further, after having responded, a node must change the mode of its P1 port to receiving mode but only when the P2 port of the upstream node has gone back into transmitting mode, e.g. by waiting during a predetermined waiting time.

As mentioned, the retrieved operating characteristic can include information which can be used for diagnostic purposes. As such, the command 200.1 as shown in FIGS. 2 and 3 can include or be a diagnostic command or command signal. When such a command propagated to the nodes, the nodes can e.g. return a summary status for their diagnostic status. This summary status can e.g. be a Boolean message indicating that there are diagnostic issues to report or not. This simple reply can be made more complex by adding for example the severity of the worst diagnostic issue to report. So embodiments can make use of a range from a simple Boolean reply up to a more detailed diagnostics report including multiple replies. By providing a summary of the diagnostic issues that have occurred, instead of readily transmitting information on all issues that have occurred, and transmitting this to e.g. a maintenance center, the required bandwidth for such a communication can be kept low.

Figure 4:
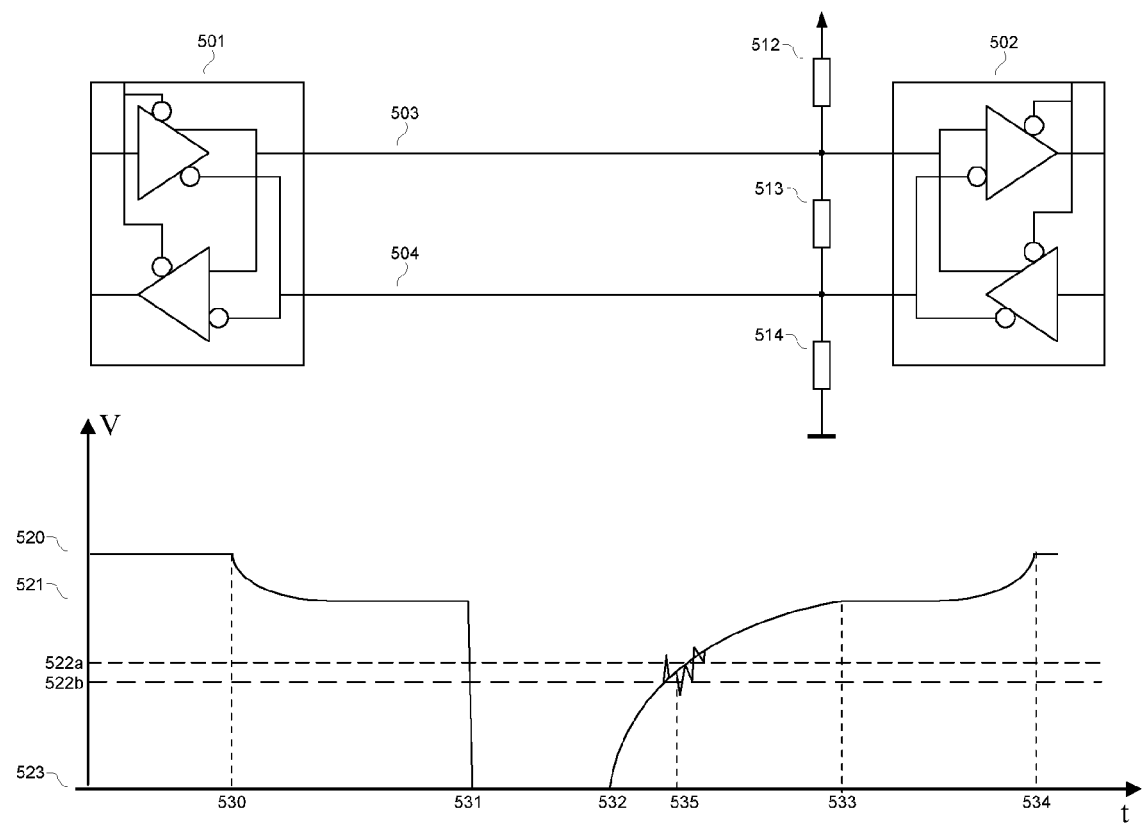
FIG. 4 schematically depicts a transceiver pair as can be applied in an embodiment of the present invention and an operating mode of such a transceiver pair.

In FIG. 4, some more details are provided on the use of a differential line by a pair of transceivers on opposite ends.

In the top part of FIG. 4 a segment of a balanced transmission line is depicted. The transceivers 501 and 502 can communicate via this segment through a coordinated alternation of the operating mode of the transceivers, thus sending and receiving messages by modulating the voltage on the transmission line 503, 504 as a sequence of data high or low (e.g. representing a logical "1" and "0".

Data high or low on a balanced line is represented by the voltage across the wires 503 and 504. When this voltage is positive above a certain threshold, the data is said to be high, while when this voltage is negative below a certain threshold, the data is said to be low (or vice versa depending on the choice for positive or negative logic).

Typically in this type of communication, the transceivers can be both in receive mode where both transmitter parts are disabled and thus do not drive the line. To guarantee a defined logic level at all receiver inputs, typically a bias network is added to the segment as shown (512, 513, 514), that defines a (typically) high logic level (Typical values for impedances 512, 513 and 514 are 680, 120, 680 Ohm resp.). This bias network may be given the characteristic impedance of the line which has the added benefit that the integrity of the signals on this segment stays adequate over longer distances than without a characteristic termination.

In the lower part of FIG. 4, an example waveform of the voltage across 503/504 is schematically shown.

Assuming a high line, driven to level 520 by some transceiver with an enabled transmitter until instance 530 whereby, at instance 530, this transmitter is disabled.

The voltage will lower to the voltage dictated by the bias network. The voltage will follow an exponential curve depending on the values used in the bias network and (mainly) the capacitance of the segment and transceiver ports. As can be seen, the voltage just prior to the instance 531 is sufficiently above logical threshold 522*a* to have all transceivers detect a logical 1 on the line. At instance 531, a transmitter is enabled which drives a negative voltage at level 523 until instance 532, where it is disabled. As a result, the line will exponentially return to the bias voltage 521. At 533, the final bias voltage level is reached, where upon a transmitter comes in at instance 534 with as an example a high level.

The voltage across the line crosses the logical levels 522*a* and 522*b* causing a transceiver to change from logic 0 to logic 1 detection at instance 535. The moment this happens can e.g. be different for any transceiver in case multiple transceivers would observe this segment, depending on a.o. tolerances on the logic level used for this decision. The line segment will in practice exhibit noise and disturbances caused by physical effects and through EMI. Transceivers may therefore switch a number of times around instance 535 instead of only once. Such erratic switching may mimic a valid data packet, causing some undesired behavior in the connected systems.

Typically the bias network is dimensioned such that the traversal through the area between levels 522*a* and 522*b* is of such short duration, that only 1 change of logic state takes place. However should the bias network not be present, than the end voltage of the line segment would not be at the level 521 but would be 0 volts in the middle between levels 522*a* and 522*b*. The line would also be high-impedant and small disturbances would already create large voltage swings in the region of voltage levels 522*a* and 522*b*. Also this situation could exist for long periods of time. This last situation would have a high risk of transceivers seeing phony/false messages and must be avoided.

Using the method according to the present invention, the situation where no transceiver is driving the line can be avoided. That means that the situations between events 530-and-531 and 532-and-533 respectively do not occur. Therefore there is no risk of receiving false messages because of disturbances.

As a results, there is no longer a need to apply the bias network, the bias network can thus be omitted. Therefore, when the methods according to the invention are applied, the network segments can be simplified as no biasing network is required. The absence of this network may also have an advantageous effect on the dissipation of the network segment.

Further, by ensuring that the differential line is driven at all instances by at least one of the transceivers connected to the line, EMI effects on the line can be avoided or mitigated; the network segments are less susceptible to EMI or EMC interference. Further, the network segments are also less likely to be the cause of such EMI, due to the absence of the biasing network. Further, as mentioned, due the absence of such a network, losses (Ohmic losses) occurring in such a biasing network can be avoided as well, resulting in a more efficient operation.

In the typical applications envisaged for diagnostics, the segment lengths are small enough to avoid termination and thus avoiding the bias network altogether.

The methods according to the invention as e.g. illustrated in FIGS. 2 and 3, can be implemented in various types of lighting system employing various types of communication protocols and/or network segments.

According to an aspect of the present invention, there is provided a lighting system for performing the methods according to the invention.

The lighting system comprising a plurality of lighting units arranged as nodes in a linear daisy-chained network having network segments comprising a downstream transceiver and an upstream transceiver that are connected to two subsequent nodes of the network, the network segments being connected downstream of a controller of the lighting system, whereby the controller is arranged to provide a command signal to a node of the network and wherein the node is arranged to provide a reply signal in accordance with any of the methods as described above.

In an embodiment, the nodes of the lighting system can e.g. comprises a plurality of LED based lighting units connected via network segments such as RS-485 type segments using a DMX-512 protocol.

In addition to retrieving an operational characteristic of the array or chain of lighting units, the controller of the lighting system can further be arranged to provide a control signal to the lighting units in order to control a lighting characteristic such as a color or an intensity of the lighting units.

In an embodiment, the controller can e.g. receive at an input terminal, an input signal representing the desired illumination characteristic of one or more lighting units of the lighting system and convert the input signal to a control signal for controlling the lighting units.

Figure 5:
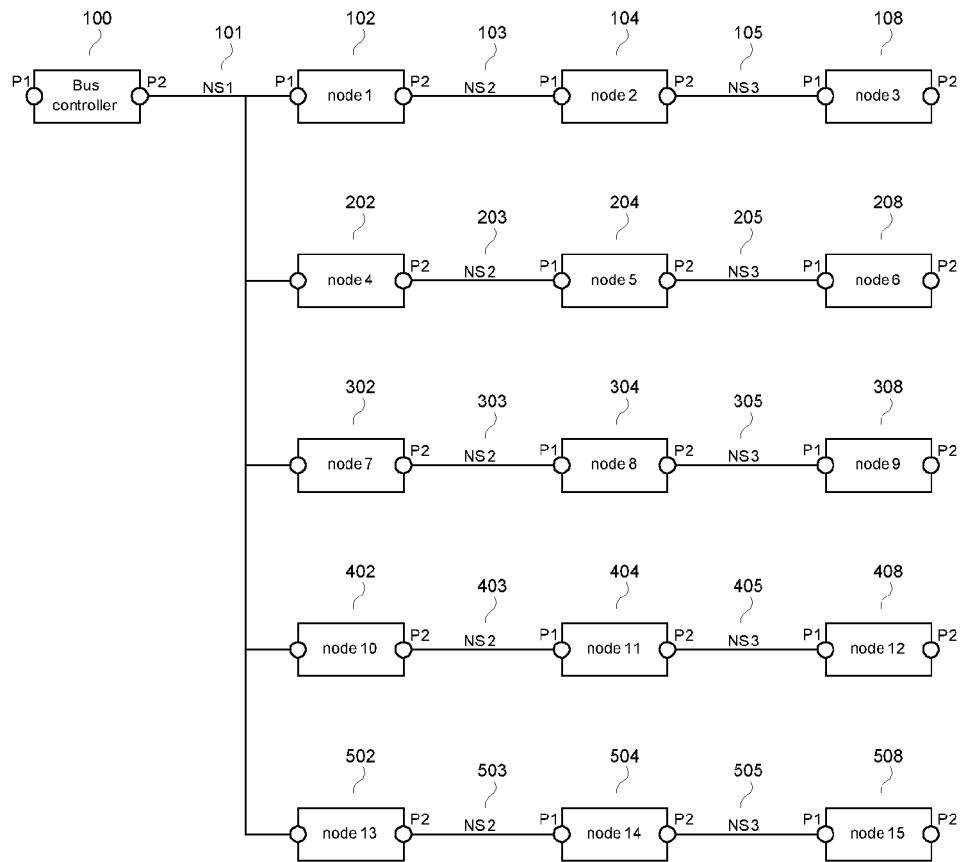
FIG. 5 schematically depicts a second embodiment of lighting system according to the present invention.

In an embodiment, the lighting system can comprise a plurality of linear daisy-chained networks that can e.g. be controlled by a common controller. In FIG. 5, such an arrangement is schematically shown. In the arrangement as shown, the controller (Bus controller 100) can operate each of the five daisy-chained networks (node 1 to node 3, node 4 to node 6, node 7 to node 9, node 10 to node 12 and node 13 to node 15) as depicted in order to retrieve operational data in accordance with the methods according to the invention.

In an embodiment, the first node of each of such daisy-chained network (i.e. nodes 1, 4, 7, 10 and 13) is referred to as master node of the daisy chained network and may be configured to have an increased functionality.

As an example, the master nodes can e.g. be configured to know the length (i.e. the number of nodes) of the array or chain they are connected to. When, as explained above, the number of connected nodes is determined by a command signal and a subsequent reply, an assessment of the length of the chain can be made by the master node and compared with the configured length. In case of a mismatch, the master node can issue an error signal to the bus controller 100.

As yet another example, the bus controller 100 can e.g. provide, in addition to the command signals for retrieving status information, control signals e.g. containing illumination set points for the nodes of the networks. Such a control signal can thus comprise a set point for each of the nodes 1 to 15, whereby the master nodes are configured to process the control signal (as can be seen, in the configuration as shown, each of the master nodes would receive the same control signal) and retrieve from the control signal the part containing the set points for its downstream nodes.

In an embodiment, the linear daisy-chained network (as shown in FIGS. 2 and 3) or the plurality of linear daisy-chained networks (as shown in FIG. 5) can be a DMX universe.

Figure 6:
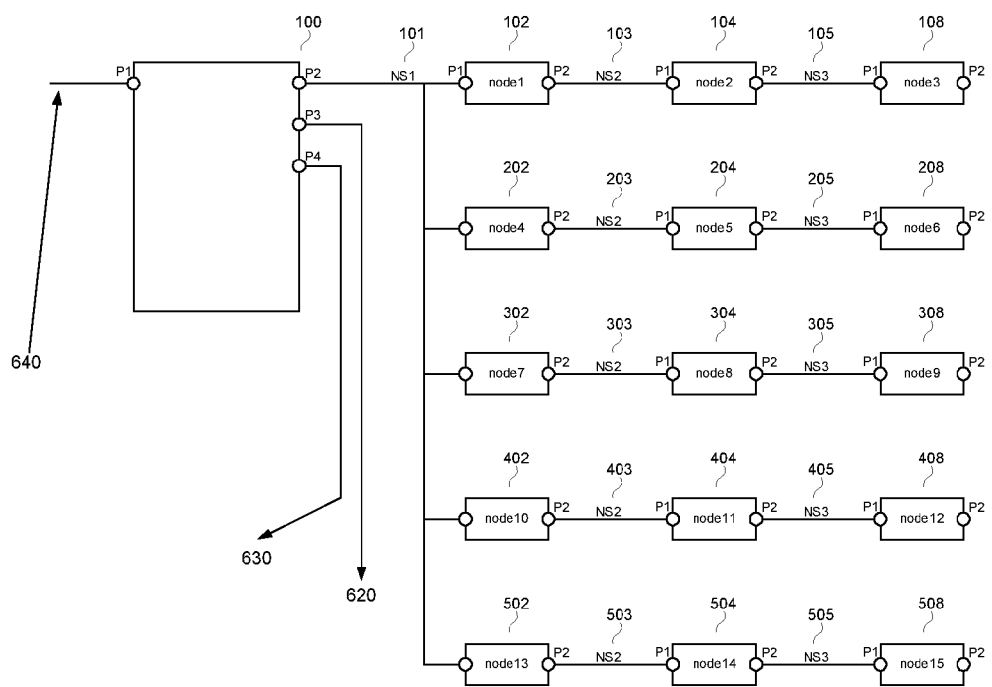
FIG. 6 schematically depicts a third embodiment of lighting system according to the present invention.

In an arrangement, the bus controller or controller as shown can be arranged to control multiple arrangements such as shown in FIG. 5 in parallel. Such a multi-controller can e.g.

control a plurality of DMX universes in which the methods of retrieving information according to the invention can be implemented. In FIG. 6, such an arrangement is schematically shown. In the embodiment as shown, a multi-controller 100 is shown having multiple output ports P2, P3, P4, which can each control a network as e.g. shown in FIG. 5 (containing the nodes 1 to 15). Nodes P3 and P4 may then connect to similar networks, referred to by 620 and 630.

In a embodiment, the multi-controller may have an input port P1 arranged to receive an input signal 640 representing a desired illumination of the lighting units of the multiple universes. Such an input port p1 can e.g. be connected to a DVI, Ethernet, USB or other type of network for receiving the input signal.

In an embodiment, the lighting units of the various networks (e.g. DMX universes) may correspond to pixels in a display. As such, each network/universe can e.g. correspond to row or column in the display.

Figure 7A:
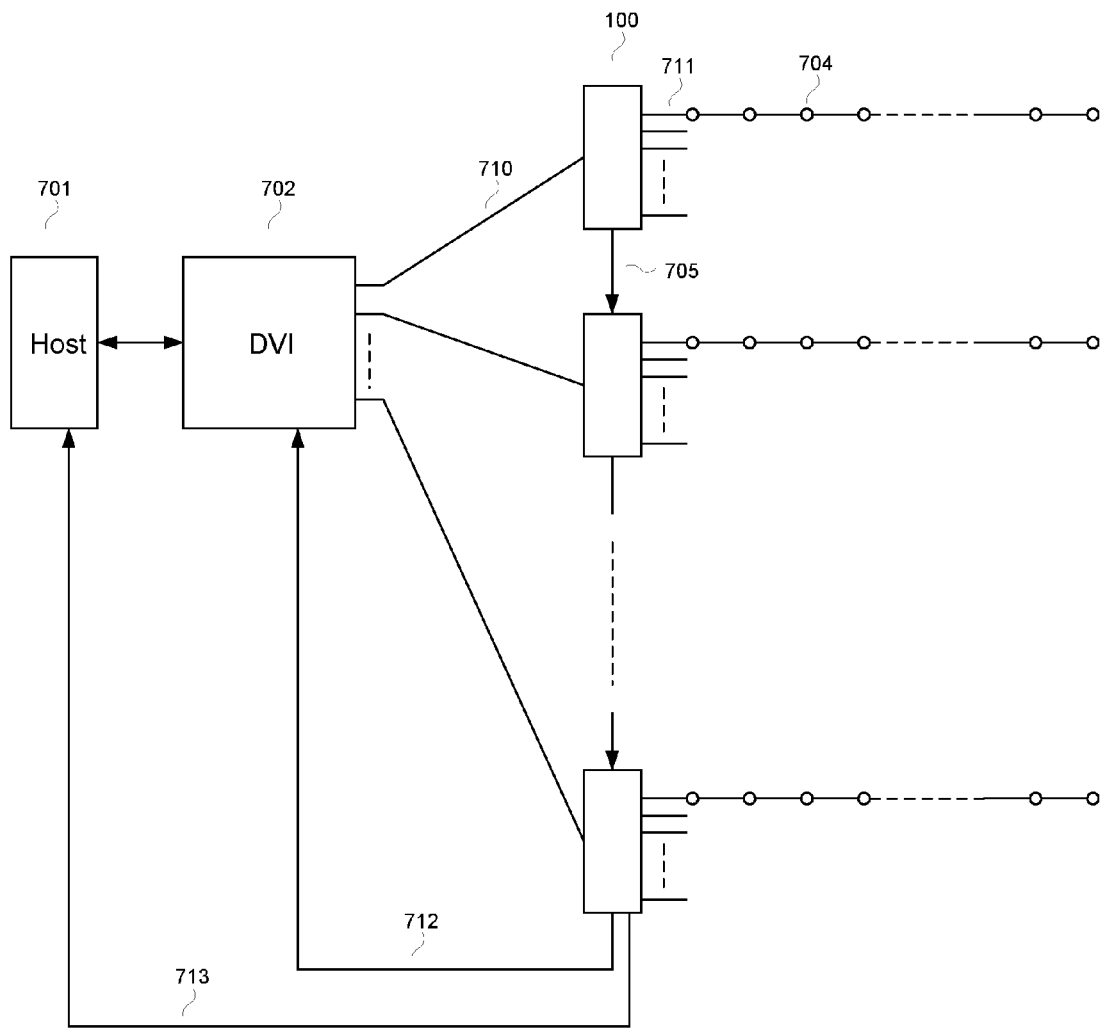
FIGS. 7a and 7b schematically depict a two further embodiments of lighting system according to the present invention.

In yet another embodiment, as schematically shown in FIG. 7a, the lighting system is a DVI/LVDS system as e.g. applied in contemporary video applications. In FIG. 7a, a host 701 is shown for sending video data to a DVI capable device 702. This device 702 can subdivide the video data into parts (each part e.g. corresponding to a certain part of a video screen (f.e. tiles)) and send these parts to bus controllers 100 (e.g. LVDS concentrators). These controllers can e.g. address lighting units such as the nodes 704 (e.g. LVDS nodes representing display pixels) via ports 711 (e.g. LVDS ports). The LVDS nodes 704 are in-line devices that e.g. repeat the data received and sent it towards the downstream neighbor. In such a system, the methods of retrieving status information according to the present invention can be applied to retrieve a status/diagnostic data of the nodes 704. As most DVI systems do not support data transport in the upstream direction, the reply signals received by the bus controllers 100 (e.g. the LVDS concentrators 703 (the reply signals e.g. comprising the status information or diagnostic data)) can be gathered through connections 705. The last concentrator can than either be hooked up to a special diagnostics port on the 702 device, or directly to the host device 701. The links 712 and 713 to do so can be of any high data rate type, like Ethernet, SRIO, PCIexpress, Hyperlink etc. on either copper or optics wire or free air etc.

Figure 7B:
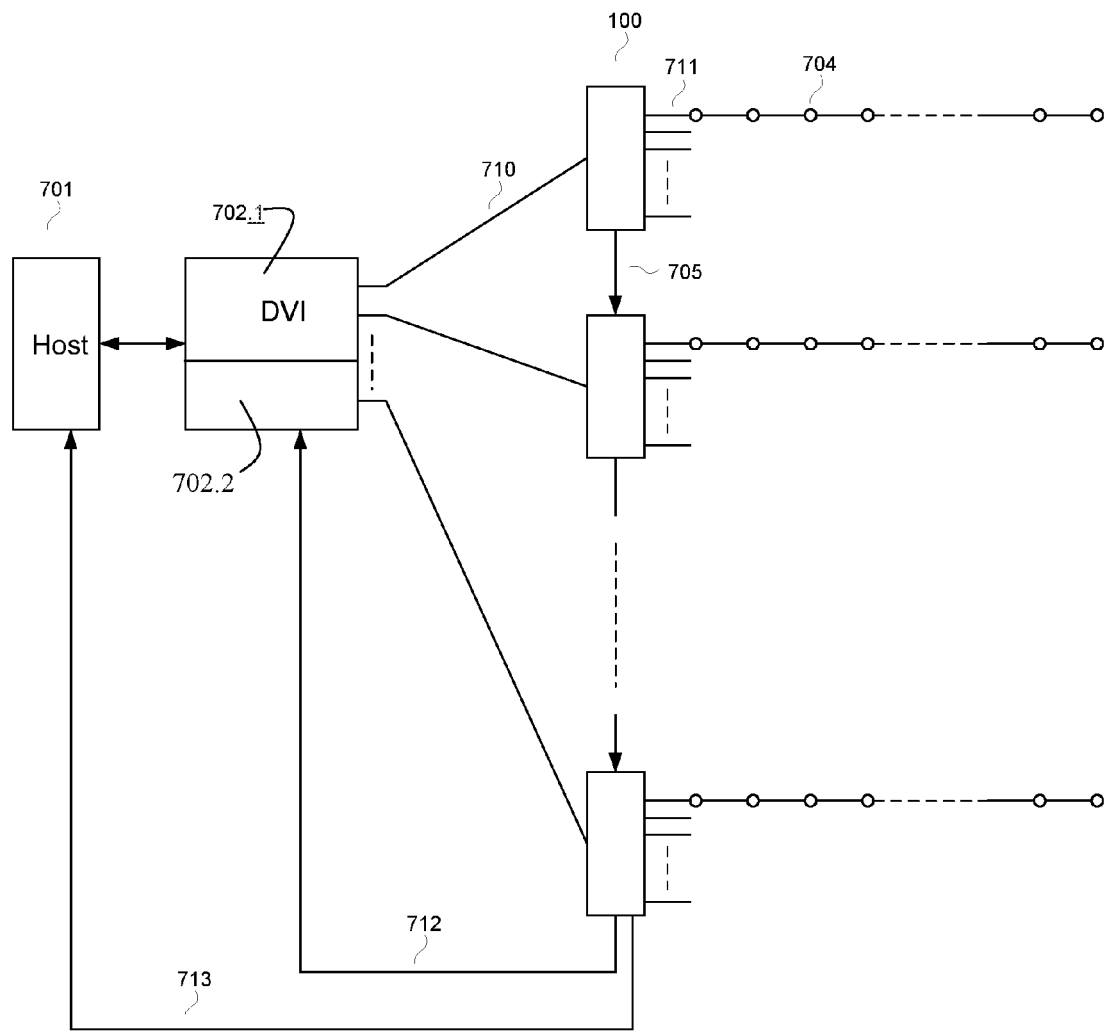

In FIG. 7b, a similar arrangement is shown as in FIG. 7a wherein the DVI capable device 702 (as shown in FIG. 7a) is subdivided in a lighting (or video) handling part 702.1 for processing video data into parts for the bus controllers 100 and a diagnostics handling part 702.2 operating independently of the video processing part. Such diagnostic handling part 702.2 may independently take care of the processing of any desired diagnostics program, e.g. including the retrieval of diagnostic information (as discussed above) on regular intervals and the processing of such information in e.g. a (web based) application as discussed. In such arrangement, both the lighting handling part 702.1 and the diagnostic handling part can communicate commands to the bus controllers for lighting control resp. retrieval of diagnostic information.

As mentioned, the retrieved status information can include information for diagnostic purposes. For each chain or each group of chains, a designated node in the chain or group of chains can further be adapted to assemble the status information, e.g. diagnostic information, into a summary report or status report. As an example, controller or control unit 130 (FIG. 1) or Bus controller 100 (FIGS. 2 and 5) or the multi-universe-controller (FIG. 6) or even root masters 102 through 502 (FIG. 5) can make a summary report of the diagnostic status of an entire chain or group of chains from the detailed diagnostics status retrieved from the nodes. Such status report can subsequently be used in a reply message to a command from a higher level master node asking for the status report or any status. Based upon the information contained in the status report, the higher level master node may issue a further command to the designated node requesting a detailed status, whereupon the designated node may reply with detailed information per chain.

So, detailed retrieval of diagnostic info can e.g. be made on chain level, whereas the detailed diagnostic information is subsequently summarized by e.g. a multi-universe controller to obtain a summary diagnostic message or status report which can be transmitted to a higher level node such as a maintenance center.

When such a diagnostic report or status report is received, an order can e.g. be issued for a maintenance engineer (ME) to come to the site where the lighting network is installed, in order to solve.

As such, in an embodiment of the present invention, a maintenance method of a lighting system is provided which uses the method or retrieving status information (e.g. diagnostic status information) of a lighting system according to the invention.

Such a maintenance method may thus include:
  gathering diagnostic information (e.g. Boolean or more detailed) using the method of retrieving status information according to an embodiment of the invention.
  when the diagnostic information meets a predetermined criterion, e.g. a certain threshold level requiring maintenance is exceeded, performing the steps of
  sending a maintenance engineer (ME) on site for
    performing an inspection step enabling to obtain an indication which lighting units or nodes need maintenance (e.g. replacement).
    performing the required maintenance on the lighting system as derived from the diagnostic information.

In an embodiment, such an inspection step can include providing a particular command, referred to as a maintenance or inspection command, to the lighting system. This can e.g. be done in a similar manner as the propagation of the command signal in an embodiment of the method of retrieving status information according to the present invention.

In reply to such a maintenance or inspection signal, the lighting units of the lighting system can be operated in a particular operating state, said operating state depending on the diagnostic information or status of the lighting units. So, upon providing a particular maintenance or inspection command, the lighting units can be operated/controlled in a predetermined manner, depending on a diagnostic/operational state. Each diagnostic issue which may arise may have a corresponding response to the inspection command:

Depending on the available functionality, lighting units can e.g. emit a green color when the diagnostic status is ok and emit an orange or red color (or other color) when a particular malfunction is detected. Other types or distinguishable operating states can also be devised such as operating in various pulsed modes.

As mentioned, the maintenance or inspection command can be issued to the lighting system in a similar manner as the command for retrieving the status information.

The inspection or maintenance command may however be issued to the lighting system by other ways of communication as well.

Examples of such ways of communication include: wired communication, e.g. via a mains supply of the lighting system, e.g. using PLC (power line communication), wireless, e.g. Standard, WiFi, DALI, NFC (Near Field Communication), communication using light (provided the node or nodes are provided with a light sensor, buttons, movement, occupancy modulation.

Using any of the communication means mentioned, the maintenance or inspection signal can e.g. be broadcasted to the lighting units, whereupon, the lighting units respond in a predetermined manner, depending on their diagnostic status.

In an embodiment, when a lighting unit has an issue that requires maintenance, the lighting system can be arranged to provide a particular response, not only for the lighting unit having the issue, but also for lighting units that are close to the particular lighting unit, thus facilitating the maintenance engineer to detect the location of the particular lighting unit.

As an example, in case a lighting unit is defective, unable to emit any light, it may be advantageous to, e.g. in reply to the maintenance or inspection command, extinct the neighboring lighting units of the defective lighting unit as well, or operate the neighboring lighting units in a particular color. In this respect, depending on the size of the lighting units relative to the overall size of the lighting system, neighboring lighting units can encompass more than merely the lighting units that are directly adjacent. As an example, in case the lighting system is a display having n×m pixels as lighting units, a defective pixel can be more easily detected when e.g. a 5×5 matrix of pixels (having the defective pixel e.g. in the center) is operated in a particular way (e.g. extinct or blinking with a predetermined color, . . . )

Alternatively, the location of a particular pixel, or in general, a lighting unit can be observed more easily by operating the entire (or part of the) row and column in which the defective lighting unit is located; the defective lighting unit thus being found at the crossing of the row and column.

As an alternative to providing to a maintenance engineer a visual way of assessing which lighting units or nodes need maintenance, the nodes may also, when available, use other ways of communication to the maintenance engineer to indicate which lighting units or nodes need maintenance. As examples of possible ways of reply by the nodes, the following can be mentioned: wired communication, e.g. via a Mains connection, wireless communication (to a dedicated user i/f, to a mobile/fixed phone, mobile/fixed tablet/PC, . . . ).

Other ways of varying the light output for the purpose of communication can e.g. include the use of steps in dimming, small oscillations, embedding a signal in the modulation applied (e.g. PWM or the like), color shifts, use of Morse code in total light or in color changes), additional signal LED communication.

Such signals (e.g. embedded in the modulation) can e.g. be received by a camera such as a smartphone camera and decoded. The signal can e.g. include (detailed) diagnostic information of the particular lighting unit and/or a unique ID of the lighting unit. Such information can optionally be encoded, e.g. using a QR-code which could be displayed on a dedicated display or even by the lighting system itself, the lighting system e.g. being on a building wall. The encoded information can thus e.g. contain the an ID of an erroneous lighting unit (e.g. a pixel), a location of the erroneous lighting unit, the cause of error, or a combination thereof.

Other types of feedback could include audio feedback, tactile feedback (shock, mechanical vibration against f.e. fingertips).

In a embodiment, the lighting units can be adapted to store information regarding diagnostically relevant events in a memory unit of the lighting unit. Such information can be included in a reply command when a method of retrieving information according to the present invention is applied. Diagnostic issues or event may thus be stored. Either in the node itself or even in the central masters/controllers above the node, depending on the amount of memory designed in the node and the capability of the node to communicate requests to its master node. In case the node has a larger amount of memory itself, it can store diagnostic events (issues) in local memory and inform either its master or a local maintenance engineer or any other party able to communicate with the node of the events stored. Possibly, these events are assigned a sequence number or can even be time-stamped. In case the node has a small memory, the historic diagnostic events can be stored on a direct master/controller or on an indirect (multiple levels up) master/controller. At the request of the local maintenance engineer, the node can request the data needed from one of its masters.

Examples of such diagnostic Issues or events are:
Component broken,
Does NOT radiate light
Radiates MORE light.
Radiates LESS light.
Radiates different light:
    different color, different CRI, different frequency content, flickering, etc.
Communication interface does not work properly (DALI, 0-10V, DMX, LEDcode, light interaction, Mains, U-I/F buttons, User I/F signal LEDs.
Temperature too high, too low.
Maximum age exceeded.

In an embodiment, the diagnostic information, e.g. the aforementioned summary or status report can, in an embodiment, be grouped and provided to a user interface providing a visual overview of a number of sites (having one or more lighting systems) and any diagnostic issues on these sites.

Alternatively, or in addition, the diagnostic information can be assembled and made available in a web based application for a maintenance engineer. Based on the diagnostic information, the application can generate a map (e.g. based on Google Maps or the like) for a maintenance engineer indicating the sites that need maintenance, e.g. including an indication of the severity of the issue that needs to be handled. The web based application may further be arranged to determine an appropriate routing for visiting the sites, whereby the route is at least party based on the diagnostic information retrieved. Other depending factors can e.g. be the cost of travel, importance of the lighting system, time of day, . . . .

The application may further be adapted to process the information to prepare a list of spare parts that need to be taken along by the maintenance engineer to a particular site.

In an embodiment, the present invention provides in an LED based lighting unit for operating as a node in a daisy-chained lighting network, the lighting unit comprising:
    one or more LEDs;
    a control unit for controlling an operating characteristic of the one or more LEDs;
    a first terminal for connecting a downstream transceiver of a first network segment of the network;
    a second terminal for connecting an upstream transceiver of a second network segment of the network,
    During use, the control unit is arranged to, in use:
    operate the downstream transceiver in a receiving mode to receive a command signal from the first network segment;
    generating a reply signal comprising status information of at least one of the one or more LEDs;
    operate the upstream transceiver in a transmitting mode to propagate the command signal to the second network segment; and reverse an operating state of the upstream transceiver of the second from operating in a transmitting mode to operating in a receiving mode only when a further transceiver of the second network segment is operating in transmitting mode.

Figure 8:
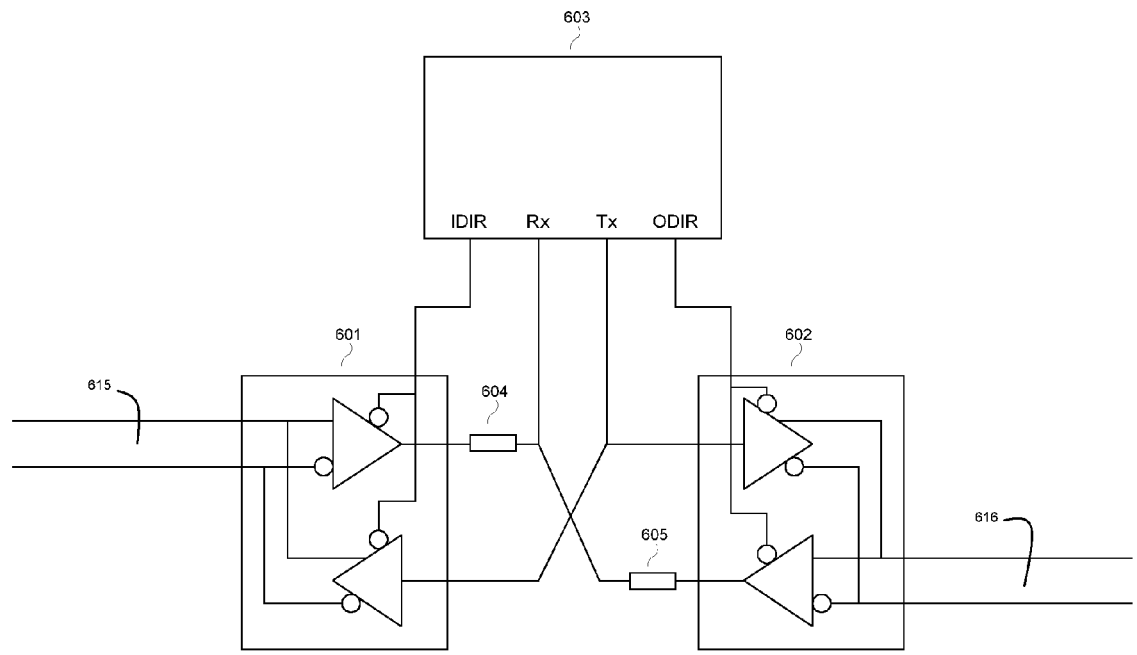
FIG. 8 schematically depicts an LED based lighting unit according to an embodiment of the invention.

In FIG. 8, a control unit 603 of such an LED based lighting unit is schematically shown together with part of a first (615) and second (616) network segment and the upstream transceiver 602 and downstream transceiver 601.

In an embodiment, the controller 603 contains a serial port with connections Rx for its input and Tx for its output. Furthermore 2 more pins are used to set the directions (operating mode of the transceivers 601 and 602. In the arrangement as shown, the output pin of the receiver part of 601 is connected to the Rx pin via impedance 604, while the output pin of the receiver part of 602 is connected to the same Rx pin via impedance 605. Using the impedances 604 and 605 prevent the receiver ports from getting damaged at those times when the controller enables both receiver parts.

In an embodiment of the lighting unit according to the invention, the values of 604 and 605 are selected such that when both receiver parts are enabled, i.e. operate in receiving mode, one of them will determine the logic level of the Rx pin. To that end the value of 604 is for example chosen at 2700 ohms while the value of 605 is chosen at 220 ohms. As a result, when transceiver 602 receives data from the segment 616 of the chain while simultaneously the segment 615 is also driving the Rx pin, the controller 603 will only observe the data received from the segment 616. This means that even when there is overlap between the receiving periods of both 601 and 602, a message from the downstream side of the chain can be received. The overlaps thus do not impose a "dead time" or extra delay (apart from the delay involved in switching the ports from one direction to the other).

In accordance with an aspect of the invention, the controllers or multi-controllers of the lighting system according to the invention are further arranged to provide a control signal to the lighting units of the system, whereby the control signal e.g. comprises an illumination set point (e.g. indicating a desired color and/or intensity) for the lighting units. In general, such a control signal is provided to the lighting units at a predetermined rate which can e.g. depend on the applied technology and on the number of lighting units that needs to be addressed.

As an example, in a daisy-chained network of 512 nodes, the nodes can be provided with set points at a rate of approx. 44 Hz, using the DMX protocol. In case less nodes are present, the refresh rate of the set points can be increased. In case of e.g. a TV application, whereby the lighting system according to the invention is e.g. implemented as a LED based TV screen, it may be desirable to refresh the set points of the lighting system at least once for every new image that is to be displayed. Typically, image refresh rates for TV applications, are:

For 50 Hz applications, an image refresh rate of 25 Hz, 50 Hz for a half-image refresh rate (i.e. using interlacing)

For 60 Hz applications, an image refresh rate of 30 Hz (33 ms), 60 Hz for a half-image refresh rate (17 ms), i.e. using interlacing.

Using the DMX protocol, a synchronization with an image refresh rate of 25 or 30 Hz would thus be possible, in order to synchronize with a half-image refresh rate of 50 or 60 Hz, the chain length needs to be decreased.

In accordance with an embodiment, the command signal (which, in accordance with the invention, is used to instruct the nodes to provide status information) is provided at the same rate as the control signal. As such, each time a control signal is issued by a controller to the one or more daisy-chained networks of the lighting system according to the invention, a command signal to retrieve status information on one or more of the nodes of the lighting system. By keeping the reply signal to such a command signal comparatively small (e.g. only a few bytes), the command and reply signal only have a minor effect on the refresh rate of the set points.

In a similar manner, the refresh rate of the set points of an illumination system, combined with the provision of a command signal and a reply signal, can be, in an embodiment, synchronized with a capturing rate of an image capturing system such as a digital camera.

In an embodiment, the refresh rate applied is 3.3 ms. So, every 3.3 ms, a control signal comprising a set point for the lighting units is provided, e.g. by a controller, to the daisy-chained network, a command signal is provided to the daisy-chained network to retrieve status information and a reply signal is received from the daisy-chained network.

Figure 9:
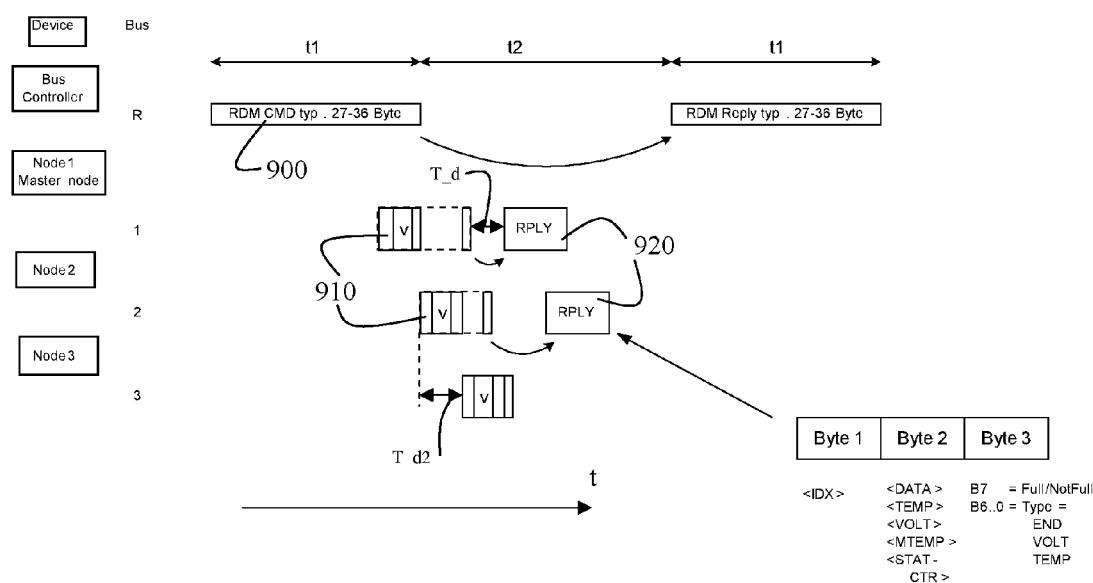
FIG. 9 schematically depicts an operation of a lighting system according to an embodiment of the present invention.

A typical operation of such embodiment is schematically depicted in FIG. 9.

Shown is a typical propagation of signals as a function of time t between a device, a bus controller and a daisy-chained arrangement of nodes (indicated by node 1 (which can be a master node), node 2, node 3).

In the arrangement as shown, a device (e.g. a user interface which can provide a desired illumination setting to the lighting system (comprising the bus controller and the nodes) communicates with the bus controller by providing commands 900 (e.g. RDM commands) which can e.g. include desired set points or an instruction to play a particular light show and may further include a command to retrieve status information. Such a command may typically have a duration of 1-2 ms. As mentioned, in a preferred embodiment, these commands are repeated at a rate of 3.3 ms, i.e. time period t2, used to propagate a signal 910 to the nodes and provide a reply signal to the bus controller.

In an embodiment, the signal 910 may thus comprise a command signal as discussed above, whereupon a node may propagate a reply (e.g. containing a status information stored in the node) towards the bus controller. The signal 910 may further comprise an illumination set point for the node or the nodes of the chain.

As can be seen, the bus controller can start propagating the signal 910 to the first node already before the entire signal 900 is received. Using one of the method as discussed above, the nodes may send reply signals 920 (e.g. containing status information such as a recorded temperature of a node) towards the controller. Such reply signals can be kept comparatively small, e.g. 3 or 4 bytes. In order to transmit such a signal towards the controller, a change of operating mode from receiving to transmitting is required. Such a change of operating mode may typically take 100-200 µs, typically having a jitter of approx. 30 µs. When the method of FIG. 3 is applied, a node may thus, upon receipt of a signal 910 (e.g. comprising the command signal), reply with a reply signal substantially within $T\_d < 0.25$ ms resulting in a comparatively small overhead. Other methods (e.g. whereby the command signal is propagated to the end node) may require additional delays. Typically, a delay to transfer a command (period $T\_d2$ as indicated) is 30-50 µs.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The term coupled, as used herein, is defined as connected, although not necessarily directly, and not necessarily mechanically.

A single processor or other unit may fulfil the functions of several items recited in the claims.

The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

A computer program may be stored and/or distributed on a suitable medium, such as an optical storage medium or a solid-state medium supplied together with or as part of other hardware, but also be distributed in other forms, such as via the Internet or other wired or wireless telecommunication systems.

The invention claimed is:

1. A method of retrieving status information of a lighting system, the lighting system comprising a plurality of LED-based lighting units arranged as nodes in a linear daisy-chained network, the network having network segments connecting two subsequent nodes downstream of a controller via an upstream transceiver and a downstream transceiver of the network segment, the method comprising:
   propagating a command signal from the controller to a node of the lighting system by operating the upstream transceivers of the network segments that are upstream of the node in a transmitting mode and operating each of the downstream transceivers of the network segments that are upstream of the node in a receiving mode;
   propagating a reply signal comprising the status information of the LED unit of the node from the node to the controller by operating the upstream transceivers of the network segments that are upstream of the node in a receiving mode and operating each of the downstream transceivers of the network segments upstream of the node in a transmitting mode; and
   reversing an operating mode of an upstream transceiver of a network segment from operating in a transmitting mode to operating in a receiving mode only when the downstream transceiver of the network segment is operating in transmitting mode.

2. The method according to claim 1, whereby the upstream transceivers of the network segments upstream of the node remain operating in a transmitting mode when the command signal has been transmitted, thereby transmitting a predetermined voltage.

3. The method according to claim 2, whereby, upon receipt of the command signal, the downstream transceivers upstream of the node reverse from operating in receiving mode to operating in transmitting mode, thereby transmitting the predetermined voltage.

4. The method according to claim 1 wherein the reversing from operating in a transmitting mode to operating in a receiving mode of the upstream transceivers of the network segments upstream of the node is performed after a predetermined waiting period after the command signal has been transmitted.

5. The method according to claim 1 wherein the reversing from operating in a transmitting mode to operating in a receiving mode of the upstream transceivers of the network segments that are upstream of the node is performed after a detection of the downstream transceiver of the network segment reversing from operating in a receiving mode to operating in a transmitting mode.

6. The method according to claim 1 wherein the command signal comprises an identifier of the node.

7. The method according to claim 1 wherein the node is an end node of the network.

8. The method according to claim 1, wherein the reply signal is concatenated with status information of each node when the reply signal is propagated to the controller.

9. The method according to claim 1 wherein the status information comprises at least one of a temperature, an intensity, an operating state, a forward voltage or a current of any of the LED based lighting units.

10. The method according to claim 1 wherein the node is arranged to retrieve the status information and store the status information in a memory unit of the node upon receipt of the command signal.

11. The method according to claim 10 wherein the node is arranged to, upon receipt of the command signal, transmit the reply signal containing the stored status information and propagate the command signal to a downstream node.

12. The method according to claim 1 wherein the command signal further comprises a control signal for controlling an illumination characteristic of any of the LED based lighting units.

13. The method according to claim 1 further including preparing a summary report for the chain of nodes based on the reply signal.

14. A maintenance method of a lighting system, the maintenance method comprising the steps of:
   retrieving status information of a lighting system according to claim 1;
   issuing an order for a maintenance engineer to inspect the lighting system; and
   providing a maintenance command signal to the lighting system for controlling the lighting system to operate in an operating state that is based on the status information.

15. A lighting system comprising
   a plurality of LED-based lighting units arranged as nodes in a linear daisy-chained network;
   a controller for providing a command signal to any of the nodes in the daisy-chained network; and
   a plurality of network segments connecting the controller and nodes, each network segment comprising an upstream transceiver and a downstream transceiver; the lighting units further comprising a control unit for controlling an operating state of the upstream transceiver and downstream transceiver that are connected to the lighting unit, wherein the controller and the control units of the lighting units are arranged to:

propagate the command signal from the controller to a node of the lighting system by operating the upstream transceivers of the network segments that are upstream of the node in a transmitting mode and operating each of the downstream transceivers of the network segments that are upstream of the node in a receiving mode;

propagate a reply signal comprising status information of the LED unit of the node from the node to the controller by operating the upstream transceivers of the network segments that are upstream of the node in a receiving mode and operating each of the downstream transceivers of the network segments upstream of the node in a transmitting mode; and reverse an operating mode of an upstream transceiver of a network segment from operating in a transmitting mode to operating in a receiving mode only when the downstream transceiver of the network segment is operating in transmitting mode.

16. A linear daisy-chained lighting network comprising:

a plurality of LED-based lighting units arranged as nodes in the network;

a controller for providing a command signal to any of the nodes in the network; and a plurality of network segments connecting the controller and nodes, each network segment comprising an upstream transceiver and a downstream transceiver; the lighting units further comprising a control unit for controlling an operating state of the upstream transceiver and downstream transceiver that are connected to the lighting unit, wherein the controller and the control units of the lighting units are arranged to:

propagate a command signal from the controller to a node of the lighting system by operating the upstream transceivers of the network segments that are upstream of the node in a transmitting mode and operating each of the downstream transceivers of the network segments that are upstream of the node in a receiving mode;

propagate a reply signal comprising the status information of the LED unit of the node from the node to the controller by operating the upstream transceivers of the network segments that are upstream of the node in a receiving mode and operating each of the downstream transceivers of the network segments upstream of the node in a transmitting mode; and reverse an operating mode of an upstream transceiver of a network segment from operating in a transmitting mode to operating in a receiving mode only when the downstream transceiver of the network segment is operating in transmitting mode.

17. A lighting system comprising a plurality of linear daisy-chained lighting networks according to claim 16, further comprising a master control unit for providing a control signal to the controllers of the networks; the control signal comprising an illumination set point for the LED based lighting units.

18. The lighting system according to claim 17 wherein the master control unit is arranged to update the control signal at a rate that is in synch with a capturing rate of an image capturing system such as a digital camera.

19. An LED based lighting unit for operating as a node in a daisy-chained lighting network, the lighting unit comprising:

one or more LEDs;

a control unit for controlling an operating characteristic of the one or more LEDs;

a first terminal for connecting a downstream transceiver of a first network segment of the network; and a second terminal for connecting an upstream transceiver of a second network segment of the network, wherein the control unit is arranged to, in use:

operate the downstream transceiver in a receiving mode to receive a command signal from the first network segment;

generate a reply signal comprising status information of at least one of the one or more LEDs;

operate the upstream transceiver in a transmitting mode to propagate the command signal to the second network segment; and reverse an operating state of the upstream transceiver of the second from operating in a transmitting mode to operating in a receiving mode only when a further transceiver of the second network segment is operating in transmitting mode.

* * * * *